(12) United States Patent
Reinders et al.

(10) Patent No.: US 10,405,500 B2
(45) Date of Patent: Sep. 10, 2019

(54) ADJUSTABLE ENDCAP FOR USE WITH A GREENHOUSE DISTRIBUTION CONDUIT

(71) Applicant: Houweling Nurseries Oxnard, Inc., Camarillo, CA (US)

(72) Inventors: Geurt Reinders, Overijssel (NL); Casey Houweling, Delta (CA)

(73) Assignee: GLASS INVESTMENT PROJECTS, INC., Wilmington, DE (US)

( * ) Notice: Subject to any disclaimer, the term of this patent is extended or adjusted under 35 U.S.C. 154(b) by 0 days.

(21) Appl. No.: 14/020,564

(22) Filed: Sep. 6, 2013

(65) Prior Publication Data

US 2014/0165459 A1    Jun. 19, 2014

Related U.S. Application Data

(60) Provisional application No. 61/697,715, filed on Sep. 6, 2012.

(51) Int. Cl.
*A01G 25/02* (2006.01)
*A01G 9/14* (2006.01)
(Continued)

(52) U.S. Cl.
CPC ............... *A01G 9/14* (2013.01); *A01G 9/246* (2013.01); *F24F 13/12* (2013.01); *Y02A 40/268* (2018.01)

(58) Field of Classification Search
CPC .......... A01G 9/16; A01G 29/00; A01G 9/245; A01G 9/247; A01G 9/14; A01G 9/24; F24F 13/12
(Continued)

(56) References Cited

U.S. PATENT DOCUMENTS

| 835,928 | A | * | 11/1906 | Allen | ........................... 422/261 |
| 1,273,779 | A | * | 7/1918 | Harris | ................... A47G 19/24 |
| | | | | | 222/142.9 |

(Continued)

FOREIGN PATENT DOCUMENTS

| DE | 10135866 | 11/2002 |
| EP | 1464219 | 10/2004 |

(Continued)

OTHER PUBLICATIONS

International Search Report and Written Opinion from PCT Patent Appl. No. PCT/US2013/058531, dated Dec. 11, 2013.
(Continued)

*Primary Examiner* — David J Parsley
*Assistant Examiner* — Danielle A Clerkley
(74) *Attorney, Agent, or Firm* — Ferguson Case Orr Paterson LLP

(57) ABSTRACT

A device is disclosed providing an adjustable endcap for use with distribution conduits in a greenhouse. The device provides a solution to seal off the end of a distribution tube while providing further means to regulate the distribution of substances such as air or gas. The device comprises a structure for sealing the end of a greenhouse distribution tube wherein the sealing structure can be freely adjusted to allow variable amounts of air or gas to escape from the sealed end. The device allows for further regulation of pressure and temperature inside the conduit, extension of climate control over a greater distance and the ability to regulate conduits on an individual basis.

16 Claims, 2 Drawing Sheets

(51) Int. Cl.
    *A01G 9/24*         (2006.01)
    *F24F 13/12*       (2006.01)

(58) Field of Classification Search
    USPC ................. 47/17, 48.5, 79; 251/205–209;
                              137/625.46; 239/581.1; 454/333
    See application file for complete search history.

(56) References Cited

U.S. PATENT DOCUMENTS

| | | | |
|---|---|---|---|
| 1,278,926 A * | 9/1918 | Henrikson et al. ... | B05B 7/1209 137/628 |
| 1,454,280 A * | 5/1923 | Henrikson ............. | 239/116 |
| 2,753,215 A * | 7/1956 | Barr ...................... | B05B 1/20 138/103 |
| 2,889,852 A * | 6/1959 | Dunlap ................. | F16K 11/074 137/625.19 |
| 3,747,501 A | 7/1973 | Osamu et al. | |
| 3,807,088 A | 4/1974 | Jones | |
| 4,242,833 A * | 1/1981 | Maes, Jr. ............... | 47/17 |
| 4,292,762 A | 10/1981 | Fogg et al. | |
| 4,516,606 A * | 5/1985 | Worley ................. | F15D 1/0005 137/625.3 |
| 4,567,732 A | 2/1986 | Landstrom et al. | |
| 4,567,939 A | 2/1986 | Dumbeck | |
| 4,586,342 A | 5/1986 | Morishita et al. | |
| 4,707,995 A | 11/1987 | Assaf | |
| 4,739,627 A | 4/1988 | Baumann et al. | |
| 4,785,976 A * | 11/1988 | Bennie .................. | A01C 15/16 222/370 |
| 4,916,642 A | 4/1990 | Kaiser et al. | |
| 5,001,859 A | 3/1991 | Sprung | |
| 5,120,274 A | 6/1992 | Zeller | |
| 5,123,574 A * | 6/1992 | Poulos ................. | B65D 83/0409 215/253 |
| 7,228,657 B2 | 6/2007 | Brault et al. | |
| 8,707,617 B2 | 4/2014 | Houweling | |
| 2004/0194371 A1 | 10/2004 | Kinnis | |
| 2005/0005510 A1 | 1/2005 | Brault et al. | |
| 2008/0000151 A1 | 1/2008 | Houweling et al. | |
| 2010/0126062 A1 | 5/2010 | Houweling et al. | |
| 2013/0075500 A1* | 3/2013 | Sithamparanathan ..... | 239/581.1 |

FOREIGN PATENT DOCUMENTS

| | | |
|---|---|---|
| EP | 2481999 A1 | 8/2012 |
| GB | 1197029 | 7/1970 |
| WO | WO 1980000486 A1 | 3/1980 |
| WO | WO 2005088204 | 9/2005 |
| WO | WO 2012078927 | 6/2012 |

OTHER PUBLICATIONS

Record of Oral Hearing for Case IPR 2017-00476; Dated Mar. 13, 2018.
Patent Owner's Opposition to Petitioner's Motion to Strike Exhibits 2040-2043 for Case IPR 2017-00476; Dated Mar. 23, 2018.
Petitioner's Motion to Strike Exhibits 2040-2043 for Case IPR 2017-00476; Dated Mar. 16, 2018.
Petitioner's Supplemental Mandatory Notices for Case IPR 2017-00476; Dated Mar. 7, 2018.
Petitioner's Objections to Patent Owner's Evidence for Case IPR 2017-00476; Dated Mar. 6, 2018.
Patent Owner's Reply to Petitioner's Opposition to Motion to Exclude Evidence for Case IPR 2017-00476; Dated Feb. 27, 2018.
Petitioner's Opposition to Patent Owner's Motion to Exclude Evidene for Case IPR 2017-00476; Dated Feb. 20, 2018.
Order Trial Hearing Under 37 C.F.R. § 42.70 for Case IPR 2017-00476; Dated Feb. 10, 2018.
Patent Owner's Request for Oral Argument for Case IPR 2017-00476; Dated Feb. 6, 2018.
Patent Owner's Motion to Exclude Evidence for Case IPR 2017-00476; Dated Feb. 6, 2018.
Petitioner's Request for Oral Argument for Case IPR 2017-00476; Dated Feb. 6, 2018.
Order Denying Authorization tor Motion to Strike and Request for Sur-Reply 37 C.F.R. §§ 42.5 and 42.20 for Case IPR 2017-00476; Dated Jan. 31, 2018.
Notice of Filing of Jan. 23, 2018 Teleconference Transcript for Case IPR 2017-0076.
Patent Owner's Objections to Petitioner's Evidence Under 37 C.F.R. § 42.64 (b)(1); Dated Jan. 16, 2018.
Reply to Patent Owner's Response; Dated Jan. 8, 2018.
Petitioner's Notice of Deposition of Alexander Turkewitsch for Case IPR 2017-00476; Dated Nov. 27, 2017.
Petitioner's Objections to Patent Owner's Evidence for Case IPR 2017-00476; Dated Oct. 10, 2017.
Patent Owner' Opposition to Institution of Inter Partes Review for Case IPR 2017-00476; Dated Oct. 2, 2017.
Notice of Deposition of Merle H. Jensen, Ph.D. for Case IPR 2017-00476; Dated Aug. 23, 2017.
Joint Stipulation of Extension of Time for Due Dates 1 and 2 for Case IPR 2017-00476; Dated Aug. 23, 2017.
Patent Owner's Objections to Petitioner's Evidence Under 37 C.F.R. § 42.64(b)(1) for Case IPR 2017-00476; Dated Jun. 30, 2017.
Scheduling Order and General Instructions 37 C.F.R. § 42.5 for Case IPR 2017-00476; Dated Jun. 16, 2017.
Decision Granting Institution of Inter Partes Review 37 C.F.R. § 42.108 for Case IPR 2017-00476; Dated Jun. 16, 2017.
Petitioner's Supplemental Mandatory Notices for Case IPR 2017-00476; Dated May 26, 2017.
Patent Owner's Preliminary Response to Petition for Inter Partes Review for Case IPR 2017-00476; Dated Apr. 11, 2017.
Petitioner's Supplemental Mandatory Notices for Case IPR 2017-00476; Dated Apr. 4, 2017.
Patent Owner's Power of Attorney for Case IPR 2017-00476; Dated Feb. 27, 2017.
Patent Owner's Supplemental Mandatory Notices for Case IPR 2017-00476; Dated Feb. 27, 2017.
Notice of Filing Date Accorded to Petition and Time for Filing Patent Owner Preliminary Response for Case IPR 2017-00476; Dated Jan. 11, 2017.
Houweling Nurseries Oxnard, Inc.'s Mandatory Notices Pursuant to 37 C.F.R. § 42.8(a)(2) for Case IPR 2017-00476; Dated Jan. 5, 2017.
Petitioner's Power of Attorney in an Inter Partes Review for U.S. Pat. No. 8,707,617; Dated Apr. 29, 2014.
Petition for Inter Partes Review for U.S. Pat. No. 8707,617; Dated Dec. 14, 2016.
Declaration of Amy Candeloro for Case IPR 2017-00476; Dated Feb. 27, 2018.
Opponents Observations in preparation for the Oral Proceedings for Application No. EP07810937.8; Dated Sep. 25, 2015.
Timeline for Innovations on http://www.bomgroup.nl/welcome/innovations/; Dated Feb. 27, 2018.
Wayback Machine 2014 Calendar on http://www.bomgroup.nl/welcome/innovations; Date Downloaded Feb. 27, 2018.
Final Written Decision 35 U.S.C. § 318(a) and 37 C.F.R. § 42.73 for Case IPR 2016-00594; Dated Aug. 24, 2017.
ExifPro Image Viewer Home Screen on http://www.exifpro.com/ for case IPR 2017-00476; Downloaded on Feb. 6, 2018.
Patents Held on http://www.houwelings.com/files-2/patents.php; Downloaded on Oct. 2, 2017.
Horti Daily Worldwide exclusive patents for Houweling's semi-closed greenhouse on http://www.hortidaily.com/print.asp?id=6571; Published on Feb. 19, 2014.
Declaration of Alexander Turkewitsch in Support of Patent Owner's Opposition to Petition for Inter Partes Review for Case IPR 2017-00476; Dated Oct. 2, 2017.
Videotaped Examination of Merle H. Jensen, PH.D.; Dated Sep. 7, 2017.
Case IPR 2017-00476 Exhibit 2026 of European Publication No. EP 1 464 219 A1; Exhibit Dated Sep. 7, 2017.

(56) References Cited

OTHER PUBLICATIONS

Case IPR 2017-00476 Exhibit 2025 of the Sunergy Greenhouse—One Year of Measurements in a Next Generation Greenhouse; Exhibit dated Sep. 7, 2017.
Case IPR 2017-00476 Exhibit 2024 of Using Semi-Closed Greenhouses to Maximize Production while Minimizing Inputs and Waste; Exhibit Dated Sep. 7, 2017.
Case IPR 2017-00476 Exhibit 2023 of Environmentally friendly greenhouses in Camarillo impresses experts on http://archive.vcstar.com/business/environmentally-friendly-greenhouses-in-camanllo-impresses-experts-ep-371888266-350864911.html; Dated May 15, 2009.
Case IPR 2017-00476 Exhibit 2022 of Innovation on http://www.houwelings.com/files-2/innovation.php; Downloaded Apr. 11, 2017.
Case IPR 2017-00476 Exhibit 2021 of the Response to Office Action for U.S. Appl. No. 11/824,159; dated Jun. 21, 2013.
Case IPR 2017-00476 Exhibit 2020 of the Office Action for U.S. Appl. No. 11/824,159; dated Mar. 15, 2013.
Declaration of Amy Candeloro for Case IPR 2017-00476; Dated Oct. 2, 2017.
Exhibit 2035 of Merriam-Webster's Collegiate Dictionary, Eleventh Edition for Case IPR 2017-00476.
Final Written Decision for Case IPR 2014-00309; Dated Mar. 23, 2014.
Exhibit 2033 for Case IPR 2017-00476, "The Snack: Dave's Specialty Produce"; dated Sep. 2017.
Exhibit 2032 for Case IPR 2017-00476, "The Packer: U.S. Grants patent for Ultra-Clima greenhouse system"; dated Feb. 26, 2014.
Exhibit 2031 for Case IPR 2017-00476, "Ventura Count Star: Greenhouse design and patent bring fewer pests and more revenue to Houweling's Tomatoes"; Dated Apr. 19, 2014.
Case IPR 2017-00476 Exhibit 2019 of the Office Action for U.S. Appl. No. 11/824,159; dated Nov. 12, 2010.
Case IPR 2017-00476 Exhibit 2018 of the Office Action for U.S. Appl. No. 11/824,159; dated Mar. 25, 2010.
Case IPR 2017-00476 Exhibit 2017 of the Notice of Allowance for U.S. Appl. No. 11/824,159; dated Jan. 30, 2014.
Case IPR 2017-00476 Exhibit 2016 of the Office Action for U.S. Appl. No. 11/824,159; dated Sep. 25, 2013.
Case IPR 2017 00476 Exhibit 2015 of the Response to the Office Action for U.S. Appl. No. 11/824,159; dated Aug. 30, 2013.
Case IPR 2017-00476 Exhibit 2014 of the Office Action for U.S. Appl. No. 11/824,159; dated Jul. 30, 2013.
Case IPR 2017-00476 Exhibit 2013 of "Air Movement", Chapter 6, by Robert J. Downs and Donald T. Krizek.
Case IPR 2017-00476 Exhibit 2012; NJAES Research Greenhouse on Rutgers New Jersey Agricultural Experiment Station https://njaes.rutgers.edu/research-greenhouse/; Downloaded on Apr. 11, 2017.
Case IPR 2017-00476 Exhibit 2011; Cornell University Agricultural Experiment Station Science for Life Greenhouses & Growth Chambers.
Case IPR 2017-00476 Exhibit 2010; Cornell University Greenhouses and Growth Chambers on https://cuaes.cals.cornell.edu/greenhouses; Downloaded on Apr. 11, 2017.
Case IPR 2017-00476 Exhibit 2009 ; Duke Trinity College of Arts & Sciences, Biology, Phytotron overview on https://biology.duke.edu/facilities/phytotron; Downloaded on Apr. 11, 2107.
Case IPR 2017-00476 Exhibit 2008; NC State University Phytotron on https://phytotron.ncsu.edu/; Downloaded Apr. 11, 2017.
Decision Denying Institution of Inter Partes Review 37 C.F.R. § 42.108 for Case IPR 2016-01309; Dated Dec. 15, 2016.
Decision Denying Institution of Inter Partes Review 37 C.F.R. § 42,108 for Case IPR 2016-00014; Dated Mar. 23, 2016.
Case IPR 2017-00476 Exhibit 2003 of the Oxford American Dictionary and Thesaurus with Language Guide edition 2003.
Declaration of Alexander Turkewitsch in Support of Patent Owner's Preliminary Response to Petition for Inter Partes Review for Case IPR 2017-00476; Dated Apr. 11, 2017.

Case IPR 2017-00476 Exhibit 1032; Bom Group; Third Party Observations in Opposition against European Patent EP2031957; Aug. 28, 2015.
Notice of Allowance for Mexican Application No. MX/a/2012/005610; dated Dec. 26, 2014.
First Office Action for Mexican Application No. MX/a/2012/005610; dated Aug. 11, 2014.
Notice of Acceptance/First Examination Report for New Zealand Application No. 599383; dated Aug. 16, 2013.
Intention to Grant for European Application No. 10 720683.1-1655; dated Nov. 22, 2016.
Certificate of Grant for Australian Application No. 2010328690; dated Jul. 14, 2016.
First Office Action for Israeli Application No. 227472; dated Feb. 17, 2015.
Second Office Action for Israeli Application No. 227472; dated Oct. 25, 2015.
First Office Action for Israeli Application No. 220017; dated Oct. 25, 2015.
Office Action from corresponding Eurasian Patent Appl. No. 201291033/31, dated Mar. 28, 2016.
Office Action from Eurasian Patent Appl. No. 201291033, dated Aug. 1, 2016.
Second Office Action for Mexican Application No. MX/a/2007/008107; dated Apr. 8, 2013.
Intention to Grant from European Application No. 07810937.8; dated Jun. 10, 2013.
First Examination Report from Corresponding New Zealand Application No. 611982; dated Nov. 26, 2013.
Examiner Report on Canadian Application No. 2.620.897; dated Jan. 16, 2015.
First Exam Report for New Zealand Application No. 705354; dated Mar. 5, 2015.
Direction to Request Examination from Australian Application No. 2011338274; dated Apr. 14, 2015.
First Office Action for Mexican Application No. MX/a/2013/006519; dated Jul. 29, 2015.
Patent Examination Report for Australian Application No. 2011338274; dated Sep. 22, 2015.
Office Action for Mexican Application No. MX/a/2013/006519; dated Feb. 3, 2016.
Final Written Decision for Case IPR 2017-00476; Dated Jun. 6, 2018.
Videotaped Deposition of Alexander Turkewitsch for Case IPR 2017-00476; Dated Dec. 13, 2017.
Second Declaration of Merle H. Jensen, Ph.D. for Case IPR 2017-00476; Dated Jan. 5, 2018.
Declaration of Martin Van Zeijl for Case IPR 2017-00476; Dated Mar. 1, 2018.
Exhibit 1028 of Pictures for Case IPR 2017-00476.
Exhibit 1027 Drawing from Turkewitsch Deposition for Case IPR 2017-00476.
Exhibit 1025 Picture for Case IPR 2017-00476.
Exhibit 1024 Figure for Case IPR2017-00476.
Exhibit 1023 Doorsnede Sunergiekas Figures P.L.J. Born Groep for Case IPR 2017-00476.
Exhibit 1022 Figure for Case IPR 2017-00476.
Exhibit 1018 for Case IPR 2017-00476; Greenhouses Advanced Technology for Protected Horticulture, by Joe J. Hanan, Dated Jan. 14, 1998.
Exhibit 1017 for Case IPR 2017-00476; Ecosystems of the World "20" Greenhouse Ecosystems, Copy 1; 1999.
Exhibit 1016 of the Response to the Office Action for U.S. Appl. No. 11/824,159; dated Nov. 12, 2010.
Exhibit 1015 of the Appeal Decision of European Patent No. 2031957; dated Jun. 27, 2016.
Exhibit 1014 of the Decision Revoking the European Patent for European Patent No. 2031957; dated Feb. 15, 2016.
Exhibit 1012 of the Proceedings for European Application No. 07810937.8; dated Feb. 15, 2016.
Exhibit 1011 of the Merriam Webster's Collegiate Dictionary, Tenth Edition; Dated 1997.

(56) References Cited

OTHER PUBLICATIONS

Exhibit 1010 of the Complaint for Damages and Injunctive Relief for: Patent Infringement 35 U.S.C. § 271 for Case 2:16-cv-04291; Filed Jun. 15, 2016.
Exhibit 1002 Reisinger Figures; Dated Dec. 13, 2016.

* cited by examiner

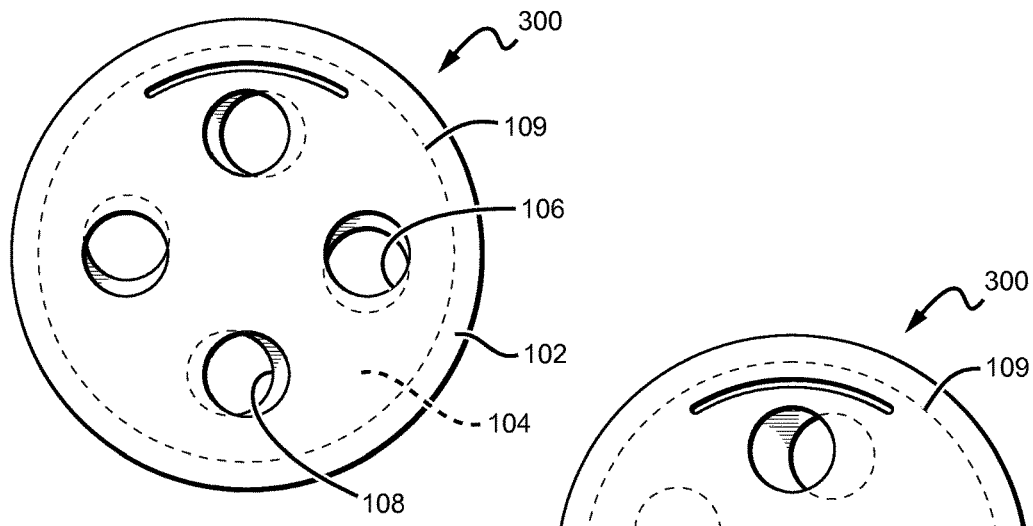
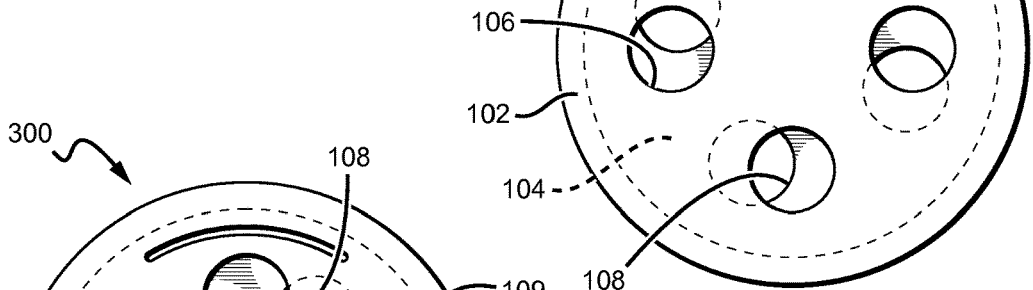
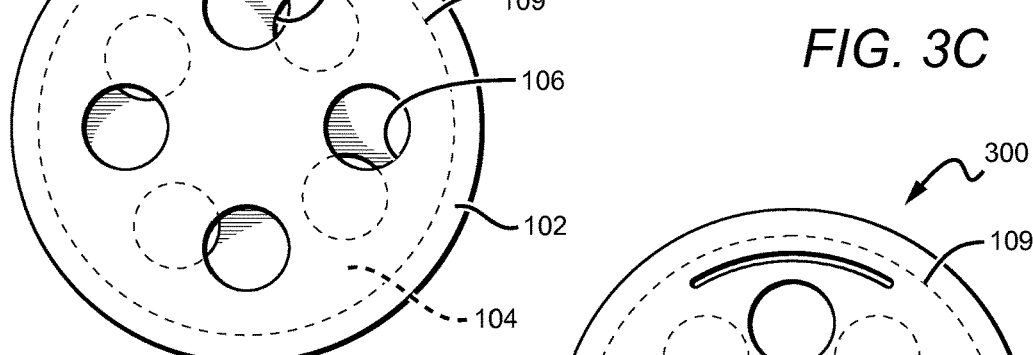
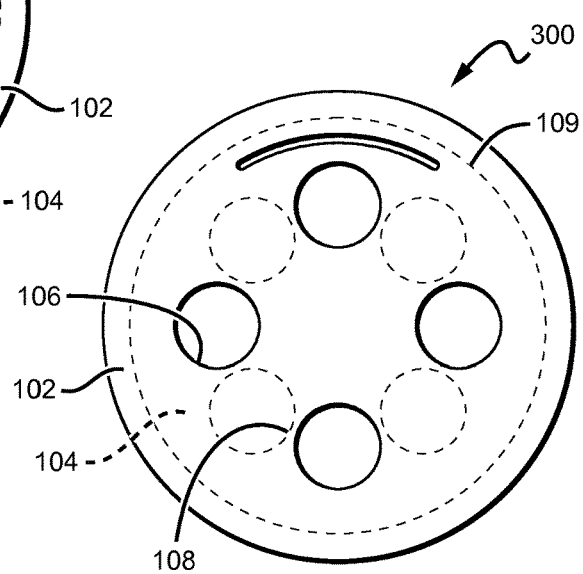

ADJUSTABLE ENDCAP FOR USE WITH A GREENHOUSE DISTRIBUTION CONDUIT

CROSS REFERENCE TO RELATED APPLICATIONS

This application claims the benefit of U.S. Provisional Application Ser. No. 61/697,715 to Geurt Reinders, entitled ADJUSTABLE ENDCAP FOR USE WITH A GREENHOUSE DISTRIBUTION CONDUIT, filed on Sep. 6, 2012, which is hereby incorporated herein in its entirety by reference, including the drawings, charts, schematics, diagrams and related written description.

BACKGROUND OF THE INVENTION

Field of the Invention

Described herein is a device relating to greenhouses, and specifically, adjustable endcaps for distribution tubes utilized in greenhouses.

Description of the Related Art

Greenhouses have been used for hundreds of years to grow different varieties of plants, including ornamental plants and fruit/vegetable-producing plants. Greenhouses typically comprise a structure with a plastic or glass roof and frequently glass or plastic walls. The interior of the greenhouse can be heated by incoming solar radiation that warms the plants and soil therein. The closed environment of a greenhouse has its own unique requirements, which may be different than those associated with outdoor plant growth compared with outdoor production. Pests and diseases need to be controlled and irrigation is necessary to provide water. Of equal importance, greenhouses can also be arranged to compensate for extreme highs and lows of heat and humidity, and to generally control the environmental conditions such as the level of carbon dioxide ($CO_2$).

Different greenhouses have been developed to control the environmental conditions within the greenhouse. U.S. Pat. No. 5,001,859 to Sprung describes a method and structure for environmental control of plant growth in greenhouse conditions. The structure comprises a translucent stressed fabric shell on a base, which is configured to grow plants, the shell and base sealing the environment within the space against external environmental conditions. The temperature and relative humidity within the production areas are generally controlled by a microprocessor based series of spray systems, along with a furnace. The spray systems can lower the temperature in the space while at the same time increasing humidity, and the furnace can be utilized to increase the temperature within the space.

U.S. Pat. No. 5,813,168 to Clendening describes a greenhouse and a method for controlling the environment of the interior space within. The greenhouse includes an interior insulating panel and a movable exterior reflective panel capable of both insulating the interior of the greenhouse and reflecting sunlight into the interior. The greenhouse also includes a closed-system heat exchanger having a plurality of spaced water-impermeable water flow passageways through which water flows by gravitational forces, and having a means for blowing air between the water flow passageways such that the air does not contact the water and such that the air is either heated or cooled by the water. In addition, the heat exchanger may include a water and/or gas discharge for the control of humidity and gas levels within the greenhouse. Finally, the greenhouse includes hydroponic plant beds disposed on top of the heat exchangers and hydroponic solution tanks along the outer interior walls of the greenhouse.

U.S. Pat. No. 7,228,657 to Brault et al. discloses a greenhouse having an exterior curtain wall structure formed by spaced tubular posts carrying external transparent panels and bottom non-transparent wall panels below a sill, with the panels spanning the posts. A plurality of elongate benches is located within the interior at spaced positions along one side wall, with the width of the benches being equal to the post spacing to form an expandable construction. Each bench has associated with it a respective air handling system for conditioning, including a duct which is located partly under the respective bench and a fan in a fan housing at the side wall. From the fan, a vertical duct section extends to a flexible tube extending over the bench.

Typically, greenhouse distribution conduits, such as tubing, distribute substances such as air or gas along the length of the conduit via perforations or other means, and are otherwise closed at the end of the conduit which is inside the growing section of the greenhouse. An example of such a sealed greenhouse distribution conduit is set forth in U.S. Pat. No. 4,292,762 to Fogg, et al. By sealing this end, the distribution integrity along the length of the conduit can be better maintained, and unequal distribution—which would otherwise occur at the location of the greenhouse growing section near the open end of the distribution conduit—can be prevented. Such means for closing the ends of distribution tubes include the use of a knotted cover, such as a plastic cover, or a permanent means of sealing, such as welding, which forms a closed capsule. However, these arrangements provide only a fixed solution to sealing the ends of the distribution tubes and do not allow for any additional control or regulation of the conduits.

SUMMARY OF THE INVENTION

Described herein is a device providing an adjustable endcap for use with distribution conduits in a greenhouse. The device provides a solution to seal off the end of a distribution tube while providing further means to regulate the distribution of substances such as air or gas. The device comprises a structure for sealing the end of a greenhouse distribution tube wherein the sealing structure can be freely adjusted to allow variable amounts of distributed substances to escape from the sealed end.

In one embodiment incorporating features of the present invention, an endcap for use with a greenhouse distribution conduit comprises a front plate comprising at least one front plate opening. The front plate openings can be adjusted such that a variable amount of air or gas from within the distribution conduit can exit from the endcap.

In another embodiment incorporating features of the present invention, an endcap for use with a greenhouse distribution conduit comprises a front plate comprising at least one front plate opening and a back plate connected to the front plate comprising at least one back plate opening. Air or gas from within the distribution conduit can exit from the endcap when the at least one front plate opening and the at least one back plate opening are at least partially aligned.

In yet another embodiment incorporating features of the present invention, an endcap for use with a greenhouse distribution conduit comprises a front plate comprising a plurality of front plate openings and a front plate rim configured to fit over the end of the distribution conduit, an adjustable back plate in direct physical contact with the front plate, the back plate comprising a plurality of back plate openings, wherein the number of back plate openings is equal to the number of front plate openings. The embodiment also includes an adjustment control groove that provides physical access to the adjustable back plate. The openings are arranged such that air or gas from within the distribution conduit can exit from the endcap when the plurality of front plate openings and the plurality of back plate openings are at least partially aligned.

In still another embodiment incorporating features of the present invention, a greenhouse comprises at least one growing section and one or more distribution conduits for distributing air or gas to the growing section, wherein each distribution conduit configured such that pressure within the conduit can be individually adjusted. Various ways of configuring such an adjustable conduit include the use of adjustable mechanisms such as valves, switches, levers, etc., to cause a variable amount of fluid, such as air or gas, to escape from the conduit, for example by opening or closing and/or adjusting the size (e.g. diameter) and/or shape of a hole or other perforation in the conduit. Endcaps as discussed herein can also be utilized for this purpose.

These and other further features and advantages of the invention would be apparent to those skilled in the art from the following detailed description, taking together with the accompanying drawings, in which:

BRIEF DESCRIPTION OF THE DRAWINGS

FIGS. 3A-3E are front views of one embodiment of an adjustable endcap according to the present invention showing how the endcap can be adjusted to regulate distribution.

DETAILED DESCRIPTION OF THE INVENTION

Figure 1:
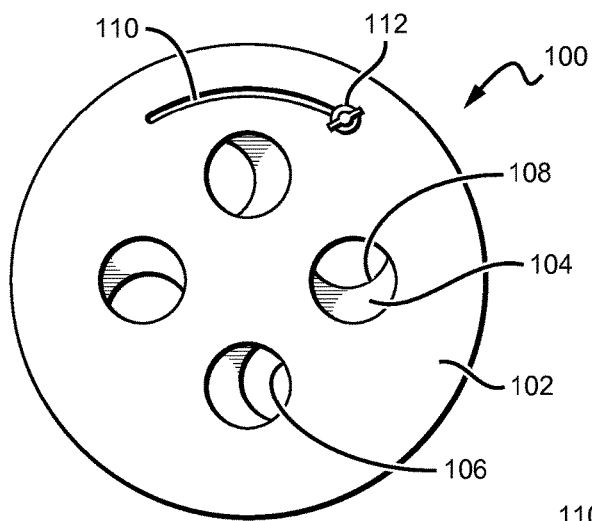
FIG. 1 is a front view of one embodiment of a adjustable endcap according to the present invention.

Embodiments incorporating features of the present invention are directed to endcaps for use with greenhouse distribution conduits that provide for a structure to seal the end of the greenhouse conduit while also providing a structure for controlling and regulating the distribution qualities of the conduit. The pressure, temperature and other properties of air or gas within an individual conduit can be adjusted by allowing a variable amount of air to exit the endcap and escape the conduit's end portion.

Endcaps according to the present disclosure can comprise one of more openings that can be varied, adjusted and/or partially opened, closed or otherwise obscured. In some embodiments this is accomplished with a multiple plate structure in which each plate comprises openings such that the openings release air or gas through the endcap from the distribution tube at variable rates depending on the level of alignment of the various plate openings. The plates can be moveable in relation to one another, for example, being rotatably moveable, or can be configured such that portions of plate endcap, for example the front plate, can be removed and repositioned to affect opening alignment. Various structures, such as adjustment grooves and corresponding intermediate structures, can be utilized to provide easier access to various plate portions.

The endcaps can also comprise various structures to facilitate connection to a distribution conduit, for example, rimmed structures that can provide a secured connection such that the endcap fits securely around or inside of a distribution conduit. The endcaps can further comprise additional structures that facilitate the use of attachment or tightening structures including hose belts, o-rings, covers/bags and sealant.

Throughout this description, the preferred embodiment and examples illustrated should be considered as exemplars, rather than as limitations on the present invention. As used herein, the term "invention," "device," "present invention" or "present device" refers to any one of the embodiments of the invention described herein, and any equivalents. Furthermore, reference to various feature(s) of the "invention," "device," "present invention" or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

The devices described herein can be used in greenhouses utilizing distribution conduits, such as water, air or gas distribution tubes which terminate in the growing section of the greenhouse. An example arrangement of such conduits can be found in US Pre-Grant Publications US 2008/0000151 A1 to Houweling, et al., filed on Jun. 28, 2007 and US 2010/0126062 A1 to Houweling, et al., filed on Dec. 11, 2009, which are hereby incorporated in their entirety by reference. The drawings, figures and their corresponding written descriptions set forth examples of greenhouses and greenhouse distribution conduits that can utilize devices as described herein.

FIG. 1 shows a front view of one embodiment of an adjustable endcap according to the present invention. FIG. 1 shows an endcap 100 comprising a front plate 102 and a back plate 104. Front plate 102 and back plate 104 are in close proximity to each other. Front plate 102 can be in direct physical contact with back plate 104 or back plate 104 can be held in position by another means. Either front plate 102 or back plate 104 or both can be movable such that front plate 102 and back plate 104 change their position in space relative to one another. In one embodiment, front plate 102 is stationary and back plate 104 is adjustable. Front plate 102 and back plate 104 can be substantially the same size or different sizes.

Front plate 102 comprises at least one opening 106 (four shown). Back plate 104 also comprises at least one opening 108 (four shown). When front plate openings 106 are completely not in alignment with back plate openings 108, back plate 104 can block or obscure front plate openings 106 such that endcap 100 can function as a conventional sealing structure for the end of a distribution conduit in the growing section of a greenhouse. Substances to be distributed such as air or gas are substantially unable to exit the tube through the end sealed by the endcap. When front plate openings 106 are completely aligned with back plate openings 108, complete openings are formed in the endcap which allow distributed substances such as air or gas to freely exit the end of the tube into the growing section. The size of the openings can be adjusted by changing the alignment of front plate openings 106 and back plate openings 108. The more in alignment openings 106 and 108 are, the larger the opening is, allowing more air or gas to exit the endcap and escape from the end of the distribution tube.

While openings 106 and 108 are shown as circular and roughly the same size, it is understood that these openings can comprise a variety of different shapes, sizes, and designs and that the shapes or designs can be chosen for various features or advantages. For example, front plate openings 106 and back plate openings 108 can be different sizes or shapes so that their alignment can affect the quality or angle of air or gas distribution at the end of a distribution conduit.

The relative position of front plate 102 and back plate 104 and the alignment between front plate openings 106 and back plate openings 108 can be controlled by a number of means. As shown in FIG. 1, adjustable endcap 100 can optionally comprise adjustment control groove 110, which is shown above the topmost of the front plate openings 106. Adjustment control groove 110 is formed in front plate 102 and provides physical access to back plate 104. One can use adjustment control groove 110 to adjust the position of back plate 104, and thus the position of back plate openings 108, in relation to front plate 102.

Back plate 104 can be directly accessed via adjustment control groove 110, or an intermediate structure 112 can be utilized. An example of such an intermediate structure would be a protrusion that is physically attached or connected to back plate 104 which protrudes through adjustment control groove 110. By moving intermediate structure 112, back plate 104 will also move. The protrusion can protrude such that its height extends higher than the surface of front plate 102. Intermediate structure 112 can promote access, such as manual access, to back plate 104 and can assist in controlling the position of back plate 104.

Intermediate structure 112 can also be utilized to restrict the movement or rotation of back plate 104 to a range of desired positions. One means of restricting movement or rotation is in an embodiment where a protrusion is connected to back plate 104 and protrudes through adjustment control groove 110 by a length that extends at least beyond the portion of adjustment control groove 110 which is level with the surface of front plate 102. In this situation, the protrusion can function as a "stop" when it comes in contact with the edges of adjustment control groove 110. In one embodiment, intermediate structure 112 is a "butterfly" nut and bolt, with the "winged" portion positioned above the surface of adjustment control groove 110 that is level with front plate 102.

While only one adjustment control groove is shown, it is understood that a device as described herein could comprise a number of adjustment control grooves in various positions on the device. Additionally, an adjustment control grove can comprise a wide variety of shapes and designs and can be a shape that does not have clear starting or ending termination points such as an unbroken circle or rectangle. Additionally, the relative positions of front plate 102, front plate opening 106, back plate 104, and back plate opening 108, can be controlled through other means or mechanisms for changing the positions of two objects in relation to each other. Such means can include various mechanical or electronic devices.

Figure 2:
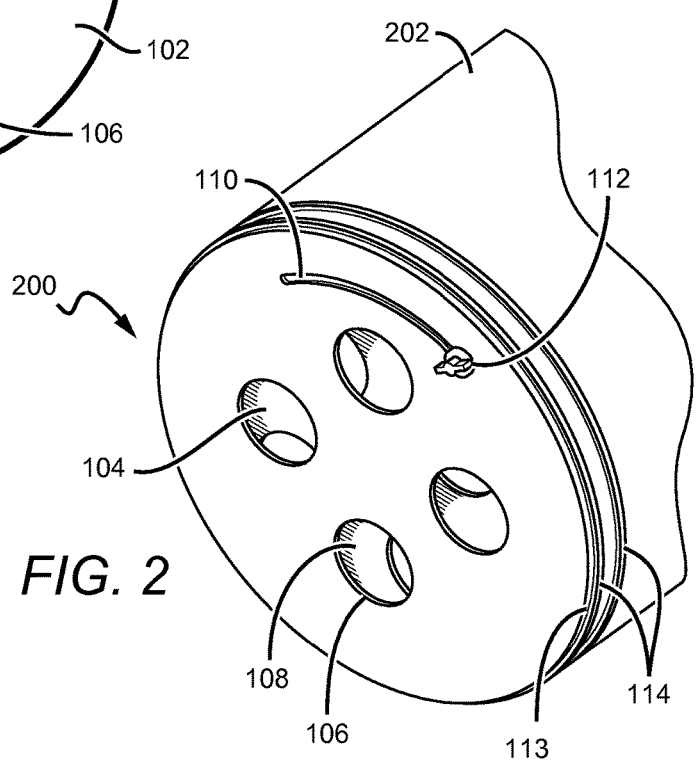
FIG. 2 is an front side perspective view of one embodiment of a adjustable endcap according to the present invention.

FIG. 2 illustrates an angled view of one embodiment of an adjustable endcap according to the present invention. The endcap 200 is similar to endcap 100 and the corresponding structures are similar where the reference-numbers are the same. Endcap 200 can comprise front plate rim 113. Front plate rim 113 can be an extension of front plate 102 that protrudes outward or away from front plate 102 and can form a cylindrical structure or lip about or around the edge of front plate 102. Front plate rim 113 need not be cylindrical and can have a variety of different shapes or configurations as needed. Alternatively or in addition to being part of or an extension of front plate 102, front plate rim 113 can be a separate structure attached or connected to front plate 102. One advantage of having front plate rim 113 as part of or an extension of front plate 102 is that it improves ease and cost of manufacturing. Front plate rim 113 can facilitate attachment or connection of endcap 200 with a distribution conduit 202. Front plate rim 113 can be configured, sized or arranged such that it can fit over the end of a distribution conduit 202 (as shown) or inside distribution conduit 202. Front plate rim 113 can be specifically configured, sized or arranged such that a desired fit to a distribution conduit can be obtained; for example a snug or air-tight fit.

Endplate 200 can further comprise distribution conduit attachment structure 114. Attachment structure 114 facilitates attachment of endcap 200 to a distribution conduit. In the embodiment shown in FIG. 2, attachment structure 114 comprises two lifted ridges on front plate rim 113. These ridges can accommodate a wide variety of attachment or tightening structures to allow for better attachment or connection of endcap 200 to a distribution conduit. Examples of such attachment or tightening structures include hose belts, o-rings, covers/bags and sealant. Attachment structure 114 can be located in or on other portions of the device and need not comprise ridges. For example, attachment structure 114 can comprise a structure configured or arranged to fit or mate with another structure formed on or within the end of a distribution conduit. Attachment structure 114 can comprise various other embodiments for facilitating attachment of endcap 200 to a distribution conduit.

Figure 3A:
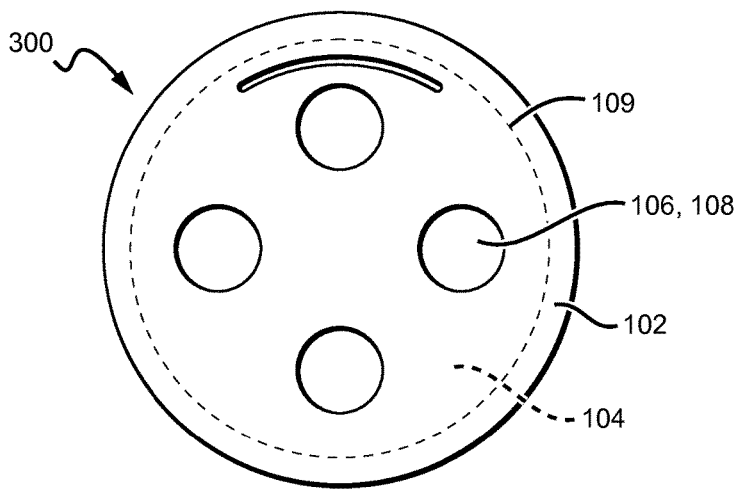

FIGS. 3A-3D are front views of an embodiment of an adjustable endcap 300, similar to endcap 100 in FIG. 1 above and endcap 200 in FIG. 2 above wherein like reference numbers are utilized to denote like features. FIG. 3A shows the alignment process between front plate openings 106 and back plate openings 108. In FIG. 3A, front plate holes 106 and back plate holes 108 are in complete alignment. In this embodiment, back plate 104 is completely obscured from view by front plate 102, however, the dimensions of obscured back plate 104 are represented by a dashed line 109.

In FIG. 3B, front plate openings 106 and back plate openings 108 are slightly misaligned. While portions of back plate openings 108 would actually be obscured from view by front plate 102, they are depicted in FIGS. 3B-3D by line-shaded areas. FIG. 3C shows the openings 106 and 108 in a greater state of misalignment. FIG. 3D shows front plate openings 106 and back plate openings 108 in a state of near complete misalignment. In this state of near complete misalignment, only a small amount of air or gas can exit the end of the distribution conduit. In situations of complete misalignment of the openings 106 and 108, as shown in FIG. 3E, the endcap functions as a sealed end of the distribution conduit.

While the embodiments discussed above primarily concern the alignment of a two-plate structure, the present invention is not limited to such a structure and includes endcaps for use with distribution conduits in a greenhouse with variable openings of any type. A single or multiple plate structure wherein openings can be effectively adjusted such that the openings allow a variable amount of distributed substance to exit the end of the distribution conduit falls within the scope of this disclosure. For example, a device as disclosed herein can comprise multiple openings that can be opened or closed by a latch or screw mechanism. Portions of the endcap can be freely removable or attachable, or their structures, orientations and configurations can be changed or altered to create or form openable or closable openings. Various other embodiments that allow the endcap to perform a sealing function or a variable distribution function also fall within the scope of the present disclosure.

Devices according to the disclosure herein have many advantages. For example, adjustable endcaps allow for regulation of each distribution conduit individually. Thus, multiple distribution conduits can have differing levels of air or gas escaping from the end portions based on the specific needs of a greenhouse. By allowing for a controlled distribution at a conduit's end, adjustable endcaps can extend climate control a greater distance beyond the reach of the distribution conduit. This allows for climate control near the end portion of a distribution conduit that would otherwise be sealed according to the prior art. Likewise, a constantly open distribution conduit end would not be adjustable or controllable.

Another advantage of devices according to the disclosure is that they can allow for additional pressure and temperature control across the length of a distribution conduit. Adjusting the amount of air or gas that escapes from the end of a distribution conduit affects the internal pressure of the distribution conduit; this in turn affects internal temperature. When operating with a distribution conduit system utilizing variable perforations, perforation shapes and/or perforation distances across the length of the distribution conduit, devices according to the present method provide another means of regulating pressure and temperature across the length of the tube and thus in different areas of the growing section.

Although the present invention has been described in detail with reference to certain preferred configurations thereof, other versions are possible. Therefore, the spirit and scope of the invention should not be limited to the versions described above.

We claim:

1. A greenhouse air or gas distribution system, said distribution system comprising:
    an air or gas distribution conduit, said conduit configured to allow a main airflow to pass through said conduit, said conduit comprising perforations along the length of said conduit to allow air or gas from said main airflow to escape from said conduit through said perforations; and
    an endcap connected to an end of said conduit, said endcap comprising a front plate comprising at least one front plate opening, wherein said at least one front plate opening can be adjusted such that a controlled variable amount of air or gas from within said distribution conduit can exit from said endcap; and
    a back plate in close proximity to said front plate, wherein said front plate is adjustable such that said back plate can at least partially obscure said at least one front plate opening to control the amount of air or gas that can exit from said endcap.

2. The distribution system of claim 1, wherein said back plate is adjustable such that said back plate can at least partially obscure said at least one front plate opening to control the amount of air or gas that can exit from said endcap.

3. The distribution system of claim 1, wherein said front plate further comprises an adjustment control groove that provides physical access to said back plate.

4. The distribution system of claim 3, further comprising an intermediate structure connected to said back plate and protruding through said adjustment control groove.

5. The distribution system of claim 4, wherein said intermediate structure restricts the movement of said back plate to a range of desired positions.

6. A greenhouse air or gas distribution system, said distribution system comprising:
    an air or gas distribution conduit, said conduit configured to allow a main airflow to pass through said conduit, said conduit comprising perforations along the length of said conduit to allow air or gas from said main airflow to escape from said conduit through said perforations; and
    an endcap connected to an end of said conduit, said endcap comprising:
        a substantially planar front plate comprising at least one front plate opening; and
        a substantially planar back plate connected to said front plate and comprising at least one back plate opening, wherein a controlled amount of air or gas from within said distribution conduit can exit from said endcap when said at least one front plate opening and said at least one back plate opening are at least partially aligned and wherein said air or gas cannot exit said distribution conduit when said at least one front plate opening and said at least one back plate opening are completely unaligned.

7. The distribution system of claim 6, wherein said front plate is moveable.

8. The distribution system of claim 6, wherein said back plate is moveable.

9. The distribution system of claim 8, wherein said front plate further comprises an adjustment control groove that provides physical access to said back plate.

10. The distribution system of claim 9, further comprising an intermediate structure connected to said back plate and protruding through said adjustment control groove.

11. The distribution system of claim 10, wherein said intermediate structure restricts the movement of said back plate to a range of desired positions.

12. The distribution system of claim 6, wherein there is no intervening structure between said front plate and said back plate.

13. The distribution system of claim 12, wherein said front plate further comprises a front plate rim integral to said front plate, wherein said front plate rim is configured to fit inside the end of said distribution conduit.

14. A greenhouse air or gas distribution system, said distribution system comprising:
- an air or gas distribution conduit, said conduit configured to allow a main airflow to pass through said conduit, said conduit comprising perforations along the length of said conduit to allow air or gas from said main airflow to escape from said conduit through said perforations; and
- an endcap connected to an end of said conduit, said endcap comprising:
  - a front plate comprising a plurality of front plate openings and a front plate rim configured to fit over the end of said distribution conduit;
  - an adjustable back plate in direct physical contact with said front plate, said back plate comprising a plurality of back plate openings, wherein the number of said back plate openings is equal to the number of front plate openings and wherein a controlled amount of air or gas from within said distribution conduit can exit from said endcap when said plurality of front plate openings and said plurality of back plate openings are at least partially aligned; and
  - an adjustment control groove that provides physical access to said adjustable back plate.

15. The distribution system of claim 14, further comprising an intermediate structure connected to said back plate and protruding through said adjustment control groove.

16. The distribution system of claim 14, wherein said intermediate structure restricts the movement of said back plate to a range of desired positions.

* * * * *